Feb. 3, 1959  N. W. ABERNETHY ET AL  2,872,424
FIBER-FORMING COMPOSITION COMPRISING CELLULOSE ACETATE
AND ACRYLONITRILE COPOLYMER AND FIBER
CONSISTING ESSENTIALLY OF SAME
Filed Dec. 16, 1954

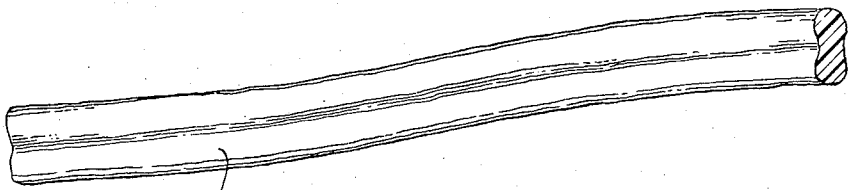

Fiber or filament of 5-95 percent of an acetone soluble copolymer of vinyl or vinylidene chloride and acrylonitrile and from 95-5 percent of cellulose acetate.

INVENTORS.
Nelson W. Abernethy
Edward M. Diss
Theodore W. Sarge
BY Griswold & Burdick
ATTORNEYS

2,872,424

FIBER-FORMING COMPOSITION COMPRISING CELLULOSE ACETATE AND ACRYLONITRILE COPOLYMER AND FIBER CONSISTING ESSENTIALLY OF SAME

Nelson W. Abernethy, Midland, Edward M. Diss, Sanford, and Theodore W. Sarge, Midland, Mich., assignors to The Dow Chemical Company, Midland, Mich., a corporation of Delaware Application December 16, 1954, Serial No. 475,844

2 Claims. (Cl. 260—17)

This invention relates to improved fiber-forming compositions comprising a copolymer of acrylonitrile and vinyl or vinylidene chloride admixed with cellulose acetate, and to fibers made from such composition.

It is known that copolymers of from 45 to 80 percent vinyl chloride and correspondingly from 55 to 20 percent acrylonitrile are useful for making fibers, and that the most useful of these contain from 56 to 62 percent vinyl chloride and from 44 to 38 percent acrylonitrile. (See U. S. 2,420,330.) It is also known that useful fibers may be made from copolymers of from 45 to 70 percent vinylidene chloride and correspondingly 55 to 30 percent acrylonitrile, and that the most useful of these contain 60 percent vinylidene chloride and 40 percent acrylonitrile. (See U. S. 2,681,325.) In each of the copolymer systems identified above, the recited range of copolymerized constitutents defines those copolymers which are soluble in acetone. Other copolymers of vinyl or vinylidene chloride and acrylonitrile are capable of forming useful fibers, but require other solvents if they are to be spun from solution.

The synthetic fibers heretofore made from copolymers of vinyl or vinylidene chloride and acrylonitrile have been limited in their utility because of certain shortcomings. They have had too low softening points to be used in fabrics which require ironing. They have exhibited undesirable amounts of shrinkage when heated, even at temperatures well below the softening point. They have been susceptible to successful dyeing with but a limited number of dyes. They are highly hydrophobic, and readily acquire an electrostatic charge which is objectionable in yarn processing and weaving operations as well as in the finished fabric. They have disadvantageously high densities, giving to products made from them a greater weight than similar products made from other fibers. These factors have restricted the fields of practical use for the fibers.

According to the present invention, each of the foregoing conditions is ameliorated, and vastly improved fibers are obtained by spinning the fibers from solution in a mutual solvent for a mixture of from 95 to 5 percent by weight of a fiber-forming copolymer of vinyl or vinylidene chloride and acrylonitrile and from 5 to 95 percent by weight of a soluble cellulose acetate. The most easily spun compositions contain 95 to 40 percent of the copolymer and 5 to 60 percent of cellulose acetate. The preferred compositions are those in which the amount of cellulose acetate is in the range from 15 to 45 percent of its combined weight with the copolymer. An especially useful composition is a mixture of 70 to 72 percent of an acetone-soluble copolymer of the defined class and from 30 to 28 percent of cellulose acetate. Such compositions are made into fibers, preferably by a wet spinning process followed by hot stretching to effect orientation. The new compositions spin more readily than do solutions of the copolymers alone, the fibers have greater freedom and are more easily processed, they have excellent tensile strengths, both wet and dry, they have a softer hand, they normally absorb a small but significant amount of moisture and accordingly acquire less static, they have a lower density than the corresponding copolymer fibers, and they are readily dyed by a variety of dyes many of which are not useful either with the copolymer alone or with cellulose acetate alone. Most important is the fact that the new fibers have much higher softening points and much lower thermal shrinkage than the copolymer fibers. The new fibers have greatly improved stability to light.

It is not necessary that the new fibers be wet spun, or that they be spun from acetone solution. Other useful solvents which may be used include tetrahydrofuran, mixtures of tetrahydrofuran and acetone, dimethyl formamide, methyl ethyl ketone, and mixtures of acetone and propylene oxide. Any solvent may be used which can dissolve both the copolymer and the cellulose acetate. When the solution is to be used in dry spinning, the solvent should be volatile at readily available temperatures which will not cause decomposition or darkening of the fibers. When the solution is to be used in wet spinning, the solvent should be miscible with the liquid of the spinning bath and the latter must be a non-solvent for the fiber-forming mixture of copolymer and cellulose acetate.

The copolymers and the cellulose acetate which give the most consistently satisfactory results in the preparation of the new fibers are those whose viscosity, measured at 25° C. on a solution of 0.5 gram of the material in 100 ml. of dimethylformamide, is from 1.8 to 2.2 centipoises for the copolymer and from 1.6 to 2 for the cellulose acetate.

The following examples illustrate the practice of the invention:

EXAMPLE 1

Several copolymers of vinyl chloride-acrylonitrile and vinylidene chloride-acrylonitrile were each dissolved in a solvent for the copolymer which is also a solvent for cellulose acetate. Cellulose acetate was dissolved in the solution, and the resulting composition was spun through a 90 hole spinneret with 0.007 inch orifices into water at 50° C. (122° F.) at a linear extrusion rate of 6 feet per minute. The coagulated fibers traveled through 26 inches of the water bath and were withdrawn therefrom at a linear rate of 12 feet per minute. They were then heated in wet steam at 100° C. (212° F.) and were stretched six-fold and were dried and wound on spools at a rate of 72 feet per minute. Samples of the fibers were removed from the spools and heated in a relaxed condition in air at 150° C. (302° F.) for seven minutes. The amount of shrinkage occurring during the heat treatment was determined. Portions of the so-treated samples were then subjected to each of several elevated temperatures to determine their softening points, and for this purpose the softening point is taken arbitrarily as the temperature at which the sample shrinks an additional 10 percent. (The cellulose acetate employed melts at about 400° F.) The results are given in Table 1.

Table 1

| Copolymer | | Cellulose acetate, percent | Solvent | Heat-Treated Fibers | | |
|---|---|---|---|---|---|---|
| Kind | Amount, percent | | | Percent shrinkage on heat treatment at 302° F. | softening Point, °F. | Change in softening point compared to fibers of copolymer, °F. |
| Vinyl chloride—60, acrylonitrile—40 | 72 | 28 | acetone | 12 | 392 | +124 |
| Vinylidene chloride—60, acrylonitrile—40. | 72 | 28 | do | 8 | 368 | +95 |
| Vinylidene chloride—50, acrylonitrile—50. | 72 | 28 | do | 10 | 392 | +14 |
| Vinylidene chloride—80, acrylonitrile—20. | 70 | 30 | dimethyl formamide | 10 | 402 | −20 |

All of the fibers of this example were readily dyed, with good exhaustion of the dye bath, using standard procedures, with such diverse classes of dyes as vat dye, naphthol–AS dyes, soluble vats, basic dyes, acid dyes, sulfur dyes and acetate dyes. In each case there was a greater depth of shade in the dye new fibers than could be obtained with the same dye bath on fibers of the copolymer alone. The greatest improvement was shown when using the vat dyes and the naphthol dyes.

EXAMPLE 2

Fibers were made in the manner described in Example 1, using mixtures of various proportions of cellulose acetate and a copolymer of 60 percent vinylidene chloride and 40 percent acrylonitrile. Half of the fibers were heat treated seven minutes at 302° F. and were then tested to determine the temperature at which six percent shrinkage would occur. The results appear in Table 2.

Table 2

| Copolymer, percent | Cellulose acetate, percent | Temperature, °F., causing 6% shrinkage | |
|---|---|---|---|
| | | Not heat treated | Heat treated |
| 100 | 0 | 180 | 267 |
| 90 | 10 | 165 | 295 |
| 80 | 20 | 224 | 335 |
| 70 | 30 | 340 | 373 |
| 60 | 40 | 385 | 405 |
| 50 | 50 | 402 | 412 |
| 40 | 60 | 412 | 412 |
| 30 | 70 | 412 | 412 |
| 20 | 80 | 412 | 412 |
| 10 | 90 | 412 | 412 |
| 0 | 100 | 412 | 412 |

As was to be expected, the heat treated samples were superior in their resistance to shrinkage at elevated temperature to the samples which had not been heat treated previously. It is noted that the untreated specimens containing only 10 percent cellulose acetate exhibited 6 percent shrinkage at a lower temperature than did fibers of the copolymer alone. This sample was more readily dyeable than is the copolymer, and, despite its low shrinkage temperature, it exhibited none of the tendency shown by the copolymer fibers to adhere to other fibers in a multiple fiber tow. In these and other tests, the heat treated fibers showed vast improvement over the copolymer fibers whenever there was at least 5 percent cellulose acetate in the composition, in such important properties as moisture retention, dyeability, high wet strength relative to dry strength, and light stability. While the compositions containing 50 percent or more of cellulose acetate show no significant variation in shrinkage temperature, it was observed that they differ greatly from cellulose acetate alone, whenever they contain 5 percent or more of the copolymer, in their retention of strength when wet. The wet strength of cellulose acetate is usually less than half its dry strength, while the wet strength of the new fibers is from 75 to 100 percent of the dry strength.

EXAMPLE 3

The behavior of the new fibers at each of several progressively higher temperatures was determined by immersing measured lengths of the fibers in an inert liquid, such as mineral oil, and increasing the temperature slowly. The samples were measured at frequent temperature intervals. For each sample, the percent shrinkage was plotted against temperature, and typical results are reported in Table 3. In each column, the number preceding the hyphen is the percent shrinkage and that following the hyphen is the temperature, in ° F., causing that shrinkage.

Table 3

| Copolymer 60% Vinyl Chloride—40% Acrylonitrile | | | Copolymer 60% Vinylidene Chloride—40% Acrylonitrile | | | |
|---|---|---|---|---|---|---|
| Copolymer Alone | 72% Copolymer—28% Cel. Acetate | | Copolymer Alone | | 72% Copolymer—28% Cel. Acetate | |
| Commercial heat treated "Vinyon" yarn | Not heat treated | Heat treated 7 min. at 302° F. | Not heat treated | Heat treated 7 min. at 302° F. | Not heat treated | Heat treated 7 min. at 302° F. |
| ------ | 0-90 | 0-345 | 0-125 | 0-225 | 0-105 | 0-300 |
| 5-275 | 5-260 | 5-375 | 5-175 | 5-260 | 5-280 | 5-325 |
| 10-280 | 10-315 | 10-385 | 10-190 | 10-270 | 10-322 | 10-360 |
| 15-290 | 15-340 | 15-392 | 15-200 | 15-275 | 15-340 | ------ |
| 20-295 | 20-370 | 18-396 | 20-215 | 20-280 | ------ | ------ |
| ------ | 23-380 | ------ | 22-220 | 22-282 | ------ | ------ |

EXAMPLE 4

Determinations were made of the wet and dry tenacities of commercial cellulose acetate yarn and of fibers made as described in Example 1 from a blend of 28 percent cellulose acetate and 72 percent of the copolymer of 60 percent vinylidene chloride—40 percent acrylonitrile. The load-elongation curves were plotted and the coordinates of the curves at the point at which the fibers broke were taken as the tenacity and elongation values. These are given below:

|  | Tenacity, grams/denier | Ultimate elongation, percent |
|---|---|---|
| Cellulose acetate: |  |  |
| wet | 0.5 | 29 |
| dry | 0.9 | 17 |
| Blend: |  |  |
| wet | 2.2 | 20 |
| dry | 2.3 | 16 |

These are not to be taken as the optimum strength and elongation values, but only as showing the relatively high ratio of wet strength to dry strength in the fibers made from the new compositions.

The high retention of strength when wet, coupled with the greatly improved resistance to heat, recommends the new fibers for use in fabrics which will be subjected to laundering and ironing. It has been found that such fabrics can be ironed safely with no dimensional change using either a steam iron or a thermostatically controlled dry iron on the "synthetic" setting. The new fibers, even those containing oly 20 to 30 percent of cellulose acetate, will adsorb about 5 percent moisture, which is much closer to the 6 percent normal moisture retention of cellulose acetate than to the less than 0.2 percent normally held by fibers of the copolymers alone.

The new fibers are surprisingly resistant to discoloration by light. Thus, the copolymer of 60 percent vinylidene chloride, in both its undyed and dyed conditions, using each of a variety of dyes was exposed in a Fade-ometer in comparison with a blend of 72 perecent of the same copolymer and 28 percent cellulose acetate in the dyed and undyed condition. The length of exposure was determined which was required to effect a noticeable discoloration of each sample. The results are:

|  | Undyed | Dyed |
|---|---|---|
| Copolymer alone, minimum hours to discoloration | 250 | 20 |
| Blend, minimum hours to discoloration | 1,000 | 80 |

In the case of the dyed samples, the dyes themselves discolor in light, but do so more slowly in the new fibers than in fibers of the copolymer.

Despite the presence of cellulose acetate therein, the new fibers containing up to 40 percent of cellulose acetate are as resistant to combustion as are fibers of the copolymer, i. e., they are self-extinguishing when ignited. Examination of the fibers microscopically shows them to consist of a continuous phase of the copolymer and a discontinuous phase of the cellulose acetate dispersed substantially uniformly therethrough. In consequence, the fibers do not have the glazed appearance of some synthetic fibers but have the slight opacity which is preferred in textile fibers for most uses where cotton and wol have been used traditionally. No inorganic opacifying agents are required to produce this effect.

The annexed drawing is an enlarged view of one of the new fibers or filaments.

We claim:

1. A fiber-forming composition comprising, as the fiber-forming constituents, (a) from 70 to 72 percent by weight of an acetone soluble acrylonitrile copolymer selected from the group consisting of copolymers of acrylonitrile and vinyl chloride that contain in the polymer molecule from 45 to 80 weight percent of vinyl chloride with from 55 to 20 weight percent of acrylonitrile and copolymers of acrylonitrile and vinylidene chloride that contain in the polymer molecule from 45 to 70 weight percent of vinylidene chloride and from 55 to 30 weight percent of acrylonitrile; (b) from 30 to 28 percent of cellulose acetate; and (c) a mutual solvent for said acrylonitrile copolymer and the cellulose acetate, said solvent being present in a quantity adequate to dissolve said fiber-forming constituents 2. A synthetic fiber consisting essentially of a blend of from 70 to 72 percent by weight of cellulose acetate and correspondingly from 30 to 28 percent of an acetone-soluble acrylonitrile copolymer selected from the group consisting of copolymers of acrylonitrile and vinyl chloride that contain in the polymer molecule from 45 to 80 weight percent of vinyl chloride with from 55 to 20 weight percent of crylonitrile and copolymers of acrylonitrile and vinylidene chloride that contain in the polymer molecule from 45 to 70 weight percent of vinylidene chloride and from 55 to 30 weight percent of acrylonitrile.

References Cited in the file of this patent

UNITED STATES PATENTS

| 2,404,714 | Latham | July 23, 1946 |
| 2,681,325 | Abernethy | June 13, 1954 |

OTHER REFERENCES

Scull et al.: American Dyestuff Reporter, "Modern Methods of Dyeing Some Manufactured Fibers," July 30, 1945, volume 34, No. 16, pages 303 and 304.